No. 866,930. PATENTED SEPT. 24, 1907.
M. W. HIBBARD.
AIR STRAINER FOR SUCTION VALVES.
APPLICATION FILED APR. 9, 1902.
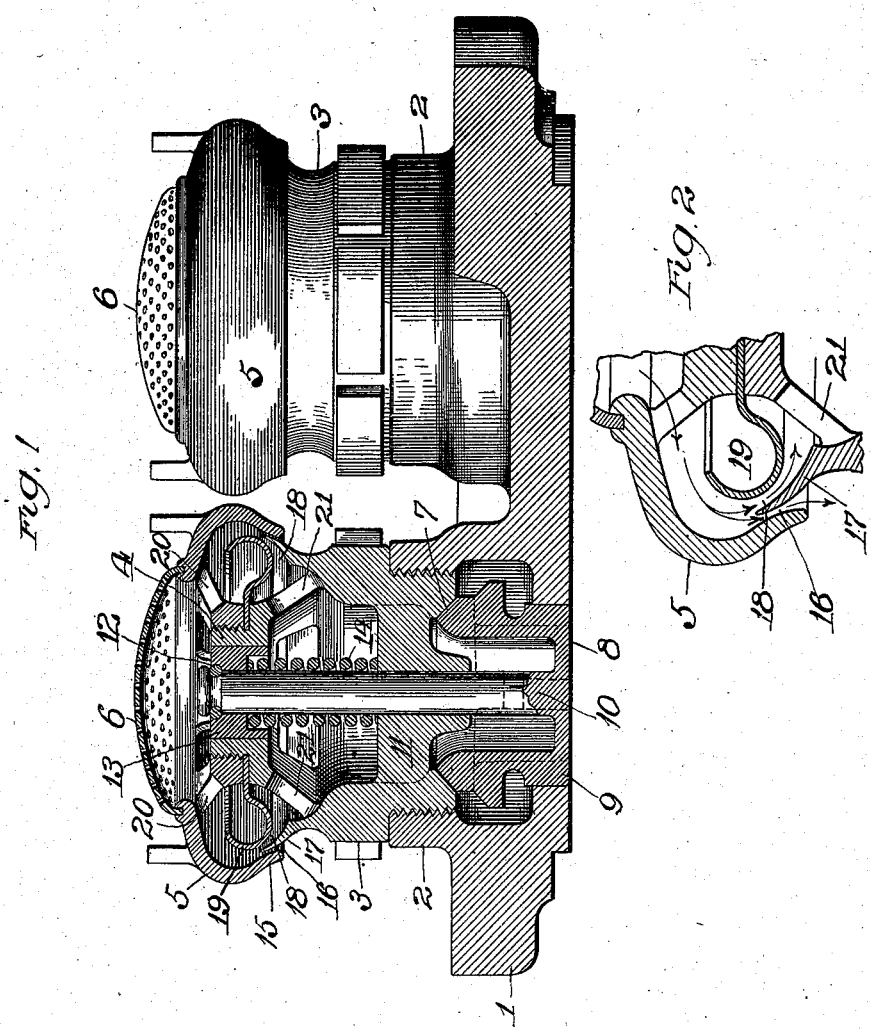

UNITED STATES PATENT OFFICE.

MAURY W. HIBBARD, OF CHICAGO, ILLINOIS, ASSIGNOR TO RICHARD FITZGERALD, OF CHICAGO, ILLINOIS.

AIR-STRAINER FOR SUCTION-VALVES.

No. 866,930.  Specification of Letters Patent.  Patented Sept. 24, 1907.

Application filed April 9, 1902. Serial No. 102,115.

*To all whom it may concern:*

Be it known that I, MAURY W. HIBBARD, residing at Chicago, Cook county, Illinois, have invented certain new and useful Improvements in Air-Strainers for Suction-Valves, of which the following is a specification.

My invention pertains to the inlet or suction valve of an air compressor, and the object thereof is to provide such a valve with means whereby the air will be thoroughly cleansed before entering the pump cylinder and as hereinafter explained, I employ a tortuous passage for the purpose of effecting the separation of the foreign particles from the air, and my inlet valve is so constructed as that such results are automatically obtained.

In the drawing Figure 1 represents a section of a cylinder head to which one or more of my valves may be secured, two of such valves being therein shown, one in elevation and the other in central section, and Fig. 2 a section of part of my valve.

The usual inlet valves are open to objections arising from the clogging and collecting of dust dirt, or grit and foreign particles generally which are too fine to be practically screened, and entrance thereof into pump cylinders, thus causing a rapid wearing away of the inner walls of the cylinder as well as a wearing of the piston and its rings, thereby permitting leakage around the piston. These objections are particularly serious in railroad work and to provide for a cleansing of the air before passing the suction valve is the object of the novel construction shown in the drawing which provides for a precipitation and separation of these foreign particles from the air.

In the present instance I have shown two of my inlet valves attached to an end head of the cylinder of a compressor, one of the valves being in elevation and its companion valve in section. However, my inlet valve may be attached at any proper place and a single one will in many cases, suffice.

The cylinder head 1, as shown, has for each valve, a boss 2 around the inlet port, into which boss screws the valve casing 3. This casing has, at its upper end, a screw threaded cylindrical portion or extension 4 on which screws a curved cap 5, open at its top where it is provided with a suitable screen or perforated metal plate 6.

The lower inner end of the casing adjacent the inlet port proper is beveled to form a valve seat 7 upon which seats a suitable inlet or suction valve. In the present instance this valve comprises a valve body 8 seating on seat 7 and having wings 9 for guiding it in the inlet port.

The valve has an upwardly extending stem 10 which passes through and is guided by a spider 11 in the valve casing. At its upper end the stem is fixed in suitable manner as by the ring 12 to a collar 13 adapted to slide in a central bore of the cylinder extension 4 of the valve casing.

In order to keep the inlet valve in proper normal position, that is, seated, a spring 14 is coiled around the valve stem one end of which spring abuts the collar 13 and the other end the spider 11, with the result that on the suction stroke of the pump piston the inlet valve will move inwards and off its seat against the tension of the spring.

The curved cap 5, above mentioned, has a lower reëntrant end 15 which is adapted to form a restricted passage 16 with the upwardly extending and outwardly flaring tapering extension or lip 17 of the valve casing. This restricted passage leads to the atmosphere. To form another restricted passage 18 but along the inner wall or side of this lip I provide a curved trough shaped plate 19 suitably arranged and supported within the valve casing with its curved portion in close proximity to the inner wall of the lip. In the present instance the plate 19 has its central flat portion clamped and held by the cap 5. The inlet holes or perforations in the screen or perforated plate are smaller than said restricted passage 16 which leads to the atmosphere so that such perforated plate will prevent entrance of foreign particles large enough to choke or clog such passage.

When the inlet valve opens air is drawn inwards through the perforated plate and the series of holes 20 in the cap. The current of air then passes down between the curved plate and the inner wall of the cap and then encounters a sharp turn or deflection just before reaching the flaring lip which forms a partition or division between the cleansed air current which passes inwards through the ports 21 to the inlet valve and port and the foreign particles thus separated all as clearly illustrated by Fig. 2. These particles thus separated are thrown beyond the flaring lip and fall outside the valve casing through the restricted passage 16. The direction of suction through the valve casing is such as to cause the air to enter through the perforated plate 6 instead of being sucked through the restricted dust passage, the proper and the herein intended path of suction being in the line of least resistance.

I claim:

1. The combination with an air compressing cylinder of an inlet valve device therefor provided with a tortuous passage for cleansing the air as it is being drawn through the inlet valve device, which passage communicates, at a point intermediate its length, with a dust outlet.

2. The combination, with an air compressing cylinder, of an inlet valve device therefor provided with a tortuous passage and also a marginal outlet passage communicating with said tortuous passage and forming the outlet for precipitated foreign particles.

3. The combination, with an air compressing cylinder, of an inlet valve device comprising a casing containing the valve proper and having an air inlet opening and a perforated cap secured to the casing and open at its bottom which forms a restricted passage along the side of the casing for the dirt or grit separated from the air.

4. The combination, with an air compressing cylinder, of an inlet valve device comprising a casing containing the valve proper and having an air inlet opening and also having a flaring lip 17 and a perforated cap secured to the casing and forming a restricted passage between itself and such lip for the exit of foreign particles separated from the air.

5. The combination, with an air compressing cylinder, of an inlet valve device comprising a casing containing a suitable inlet valve and having a lip 17 and an air opening 21 at one side thereof to communicate with the inlet valve, and a perforated cap secured to the casing and forming with the lip a restricted passage to the atmosphere.

6. The combination, with an air compressing cylinder, of an inlet valve device comprising a casing containing a suitable inlet valve and having a lip 17 and an air opening 21 at one side thereof to communicate with the inlet valve, a plate arranged in proximity to the inner side of such lip to form a restricted passage to the opening 21, and a cap 5 secured to the casing and forming with the outer side of the lip a restricted passage to the atmosphere.

7. The combination, with an air compressing cylinder, of an inlet valve device comprising a casing 3 containing a suitable inlet valve and having a flaring lip 17 and a series of air openings 21 adjacent to said flaring lip to communicate with the inlet valve and a curved circular cap arranged in close proximity to the outer side or face of such lip to form a restricted passage from one side of said cap to the atmosphere, said cap being perforated to provide air inlets, and a curved disk or plate located within said cap and disposed in close proximity to one side of such lip to form a restricted passage from said air inlets to said air openings 21.

8. An inlet valve comprising a casing arranged to communicate with the inlet port of a compressor and an inlet valve therein for governing such port, said casing having a tortuous and restricted passage for the air, a portion of said passage being substantially annular, and said casing also having an outlet passage for the escape of precipitated foreign particles and substantially concentric with said annular portion of the tortuous passage.

9. The combination, with an inlet valve, of a casing therefor communicating with the inlet port and containing two restricted passages, one leading to the inlet port and the other to the atmosphere, for the purposes herein stated.

10. The combination, with an inlet valve, of a casing therefor communicating with the inlet port and having an outwardly extending lip and means for forming two restricted passages on either side of said lip, one to said port and the other to the atmosphere for the purposes herein stated.

11. In a device of the class described, the combination with an air compressing cylinder, of an inlet valve device comprising a casing containing a suitable inlet valve having a lip 17 and an air opening 21 to communicate with the inlet valve, a trough shaped plate 19 arranged in proximity to the inner side of the lip, and a cap 5 secured to the casing and forming in connection with the said plate a restricted passage 16 and in connection with the lip a second restricted passage 18.

12. The combination with an air compressing cylinder of an inlet valve device therefor having a cap provided with air inlets and also provided with a tortuous inlet passage communicating with a passage for the precipitated dust and with a separate passage for the cleansed air on its way to the inlet valve and arranged adjacent the dust passage.

MAURY W. HIBBARD.

Witnesses:
S. E. HIBBEN,
LOUIS B. ERWIN.